United States Patent [19]
Price et al.

[11] 3,707,748
[45] Jan. 2, 1973

[54] CUTTING TOOL FOR HOLDING A PLURALITY OF DISPOSABLE CUTTING INSERTS

[75] Inventors: Warren R. Price, Utica, Mich. 48087; John H. Brownlee, St. Clair Shores, Mich. 48080

[73] Assignee: General Electric Company

[22] Filed: Dec. 7, 1970

[21] Appl. No.: 95,445

[52] U.S. Cl. ................29/95.1, 29/96, 29/105 A
[51] Int. Cl. ..........B26d 1/04, B26d 1/00, B26d 1/12
[58] Field of Search..........29/96, 97, 98, 105, 105 A, 29/95.1

[56] References Cited

UNITED STATES PATENTS

| | | | |
|---|---|---|---|
| 1,569,524 | 1/1926 | Noll | 29/105 |
| 994,264 | 6/1911 | MacKay | 29/105 |
| 3,126,611 | 3/1964 | Wiles | 29/95.1 |
| 3,262,183 | 7/1966 | Raehrs | 29/95.1 |
| 2,173,074 | 9/1939 | Roumaine | 29/95.1 |
| 3,526,025 | 9/1970 | Sletten | 29/95.1 |
| 2,377,773 | 6/1945 | Francis | 29/105 |
| 2,914,838 | 1/1959 | Robinson | 29/105 |
| 2,498,721 | 2/1950 | Stafford | 29/105 |
| 3,200,474 | 8/1965 | Kvalowetz | 29/105 |

Primary Examiner—Harrison L. Hinson
Attorney—Allard A. Braddock, Frank L. Neuhauser, Oscar B. Waddell and Joseph B. Forman

[57] ABSTRACT

A cutting tool of the broach type for holding a plurality of disposable and indexable cutting inserts. The broach tool comprises a holder body having a plurality of transverse grooves on its peripheral surface, each of the grooves containing a plurality of spaced cutting inserts. The cutting inserts, generally U-shaped, straddle projections in the base of the groove for lateral location of the insert. A wedge member adjacent the inserts cooperates with the projections to hold each of the inserts in spaced location in the grooves of the holder body.

4 Claims, 7 Drawing Figures

PATENTED JAN 2 1973 3,707,748

INVENTORS
WARREN R. PRICE
JOHN H. BROWNLEE
BY
Harold J. Holt
ATTORNEY

PATENTED JAN 2 1973 3,707,748

INVENTORS
WARREN R. PRICE
JOHN H. BROWNLEE
BY
Harold J. Holt
ATTORNEY

CUTTING TOOL FOR HOLDING A PLURALITY OF DISPOSABLE CUTTING INSERTS

This invention relates to a cutting tool containing a plurality of disposable cutting inserts and more specifically to a cutting tool of the broach type and to disposable cutting inserts of unique configuration for use in the broach tools.

Broach tools have been used for many years for the machining of metal. Such tools have frequently been of the type in which a cemented carbide or other hard metal cutting insert is brazed into the broach body for firm retention. Broaches containing mechanically held inserts of the disposable type are also known. However, a broach is normally subjected to unusually severe stresses in a machining operation. This, coupled with the relatively large number of cutting inserts normally present in a broach, has made it difficult to provide simultaneously for firm retention of the cutting inserts, smooth chip flow across the broach body, and relatively convenient and easy indexing and replacement of the disposable cutting inserts.

The present invention has as its principal object a broach tool providing for firm retention and maximum support of a cutting insert during use, smooth flow of chips during the broaching operation, and relatively simple, accurate and quick indexing or replacement of the insert.

It is an additional object of this invention to provide a cutting insert of a unique design, particularly suitable for use in the cutting tools of the invention.

These and other objects are achieved in a cutting tool containing a plurality of disposable cutting inserts and comprising a holder body having at least one transverse groove on its peripheral surface, the groove containing at least one projection at each insert-receiving location. The disposable cutting insert is releasably held in the transverse groove at the insert-receiving location by means of a wedge member. One end of the insert extends radially outward beyond the peripheral surface of the holder to expose a cutting edge. The other end of the insert has a recess therein, straddling the projection in the groove to laterally locate the insert. The wedge member is located adjacent the insert within the groove and together with the projection releasably but firmly holds the insert against movement in the broach.

The invention will be more clearly understood from the following description taken in connection with the accompanying drawing in which.

Figure 1:
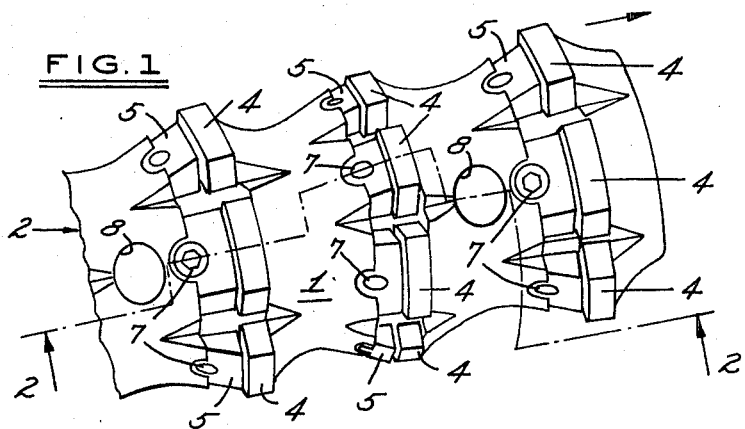
FIG. 1 is a fragmentary perspective view of a broach tool in accordance with the invention.
Figure 2:
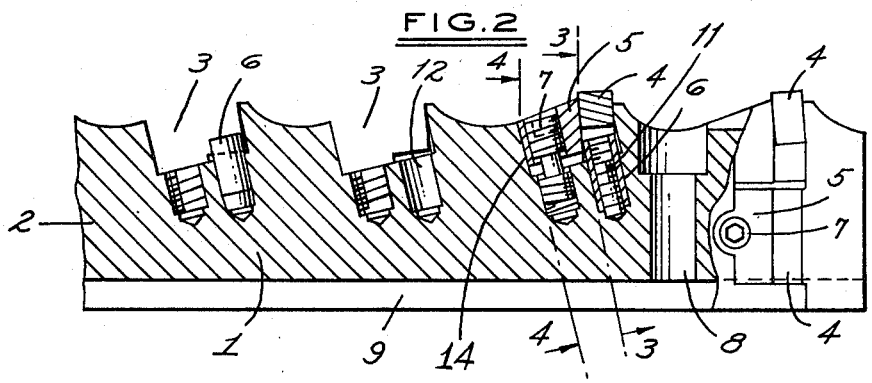
FIG. 2 is an elevational view, partly in section, of the broach tool, with some repetitive components removed, along lines 2—2 of FIG. 1.

As can be seen in FIGS. 1 and 2, the broach tool 1 of the invention comprises an elongated semicylindrical in-cross-section holder body 2 containing a plurality of circumferential grooves 3 on the peripheral surface of the broach body transverse to and spaced along the axis of the body. Each of the circumferential grooves contains either three or four disposable and indexable inserts 4 at spaced insert locations. These inserts are normally of cemented carbide, usually cemented tungsten carbide. The cutting direction of the broach is in the direction of the arrow, as illustrated in FIG. 1. The inserts are held in position in the broach by combination of wedge members 5 spaced axially adjacent each insert, together with pins or projections 6 at each of the insert-receiving locations. Each wedge member 5 comprises an externally threaded differential screw 7 threaded in one direction at the upper portion thereof, intended to fit within the wedge member, and threaded in an opposite direction at the lower portion thereof, intended to fit within the broach body. Thus, by rotation of the differential screw, as for example with a hex wrench, the wedge member will be threaded radially into or out from the broach body to lock or unlock the insert. As most clearly seen in FIG. 1, the inserts are mounted in the broach tool at axially staggered locations from one circumferential groove to the next adjacent groove, i.e., they are not axially aligned from one groove to the next. Each alternate groove contains inserts mounted in aligned position along the axis of the holder. This provides cutting action across the entire circumference of the upper broach body. The broach body shown in fragmentary view in FIGS. 1 and 2 can contain any number of additional circumferential grooves, spaced and repeated as described above. The broach body 2 also contains mounting holes 7 and keyway 9 (FIG. 3) for attaching the broach to a broach plate holder (not shown) on a broaching machine.

Figure 3:
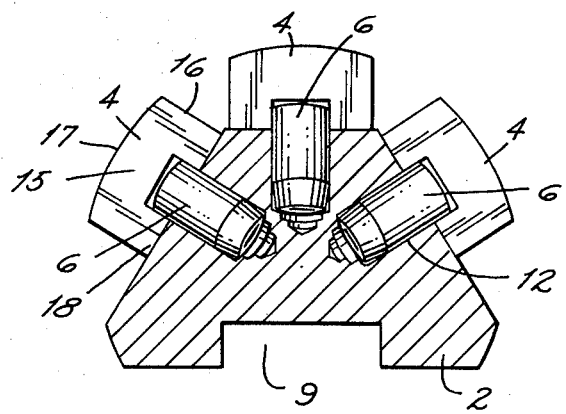
FIG. 3 is a cross-sectional view taken along the lines 3—3 of FIG. 2.
Figure 4:
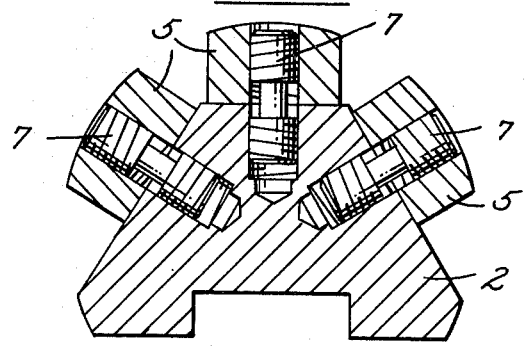
FIG. 4 is a cross-sectional view taken along the lines 4—4 of FIG. 2.
Figure 7:
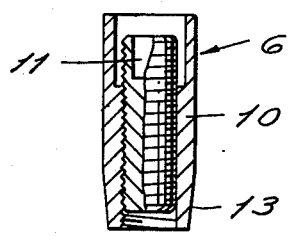
FIG. 7 is an elevational view of the bushing used to locate the inserts in the broach tool of FIGS. 1–4.

As most clearly seen in FIG. 3, the pins or projections 6 are spaced along the base of the groove 3. Inserts 4 straddle the projections and this serves to locate the insert laterally within the groove. As can be most clearly seen in FIGS. 2 and 7, the projection 6 comprises an internally threaded cylindrical bushing 10 and a threaded screw 11, within the cylindrical bushing. The bushing 10 fits within a cylindrical slot or hole 12 in the base of the groove 3 and is slidable in a radial direction within the cylindrical slot. The bushing fits within the cylindrical slot by a friction fit, the lower portion of the bushing 10 being tapered at 13 so that it can more readily be inserted within the cylindrical slot. To remove the bushing from its hole, as for example for replacement, the screw 11 is threaded radially inward. The bushing will slide radially outward from its slot in the base of the groove as the screw 11 presses against the bottom of the slot. The screw itself will not normally be damaged during a broaching operation because it will receive none of the cutting stresses. Thus, a location device is provided for precisely locating the position of the insert in a lateral direction in the groove of the holder, and yet is easily removable for purposes of disassembly or replacement.

The insert is shown in the cutter body in FIGS. 1 and 2 at a small negative-rake angle forming an approximately 3° angle with a radial plane normal to the cutting tool. The rear surface 14 of the wedge member 5 is at an angle of 10° to its front surface, or at a total angle of 13° to a radial plane normal to the broach tool.

Figure 5:
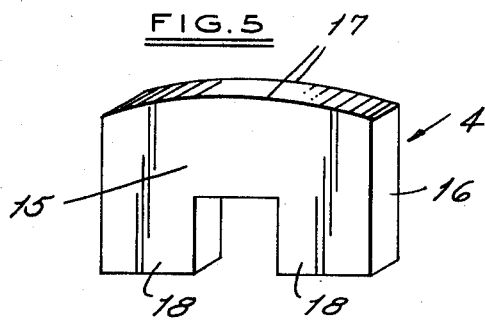
FIGS. 5 and 6 are perspective views of two different inserts useful in the practice of the invention.
Figure 6:
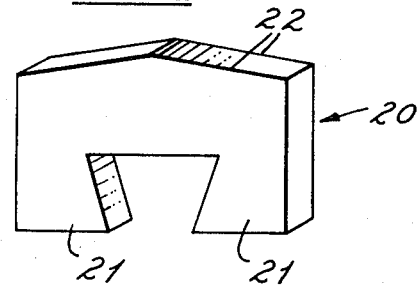

The insert of the invention is more clearly shown in FIGS. 5 and 6. In FIG. 5 the insert 4 comprises two spaced parallel and equal, generally U-shaped faces 15 on opposite sides thereof. A peripheral surface 16 joins the two parallel faces. The faces and the peripheral surface join at equal angles to form two convex cutting edges 17 on opposite sides of the insert. In the insert shown, the angles at which the peripheral surface and faces meet are 90° although other cutting edge angles may be used. The legs 18 of the U-shaped insert form a slot or recess which is intended to straddle the bushing 6 when it is placed in the broaching tool and the legs 18 should accordingly be separated by a distance only very slightly greater than the outer projecting diameter of bushing 6.

An alternative insert design is shown in FIG. 6. The insert 20 there shown, while still generally U-shaped, has legs 21 which form a dovetail slot for a complementary-shaped projection (not shown) to complete the dovetail fit. In addition, the upper portion of the insert, containing two cutting edges 22, is triangularly shaped rather than curved as shown in FIG. 5. The configuration of the cutting edge will, of course, depend upon the type of broaching or other cutting operation that is intended.

As can best be seen in FIG. 1, the broach tool has a relatively smooth silhouette, that is, there are no substantial interruptions or sharp corners projecting from the upper surface of the broach tool body other than, of course, the cutting insert itself. The chips will therefore flow unobstructed over the surface of the broach tool as they are formed, a factor of considerable importance in a broaching operation. The instant invention thus provides for positive locking, laterally, radially and axially, of disposable inserts in a broach tool, with a minimum of obstruction to the flow of chips during a broaching operation.

In addition, the broach tool of the invention provides maximum support for the insert in an axial direction, which is the direction of the primary cutting stresses. The inserts of the present tools are substantially fully supported thru the entire broach body on both their forward and rear axial faces. Such support is particularly critical in a broaching operation where the stresses to which the inserts are subjected are extremely great.

We claim:

1. A broach tool containing a plurality of disposable cutting inserts comprising
    a holding body having an axial forward and rear portion,
    a plurality of transverse grooves in said body spaced along the axis thereof, each of said grooves containing projections at spaced insert locations, each of said projections comprising an internally threaded cylindrical bushing and a threaded screw, the bushing fitting within a cylindrical hole in the base of one of the grooves in said holder body and the threaded screw fitting within the bushing,
    a plurality of disposable generally U-shaped cutting inserts defining two leg portions joined by a base portion releasably held in said transverse grooves at said spaced insert locations, the base portion of said inserts extending laterally outward beyond the peripheral surface of the holder body to expose a cutting edge along an axially forward portion of the insert, the leg portions of each of said inserts straddling one of said projections to laterally locate said inserts,
    wedge members within said groove positioned adjacent to said inserts,
    said wedge members and projections serving to releasably but firmly hold the inserts against movement in said broach.

2. The broach tool of claim 1 in which the holder body is elongated and curved in cross section.

3. The broach tool of claim 1 in which the only substantial interruption in the contour of the tool is the slight radial projection of the cutting insert.

4. The broach tool of claim 1 in which the cutting inserts are staggered along the axis of the holder body in adjacent grooves.

* * * * *